United States Patent

Kinoshita et al.

[11] Patent Number: 5,892,650
[45] Date of Patent: Apr. 6, 1999

[54] SOLENOID VALVE DRIVING DEVICE

[75] Inventors: Hisashi Kinoshita, Tokyo; Kazutoshi Yogo, Aichi-gun; Takahiro Kiso, Kariya, all of Japan

[73] Assignee: Denso Corporation, Kariya, Japan

[21] Appl. No.: 980,319

[22] Filed: Nov. 28, 1997

[30] Foreign Application Priority Data

Nov. 29, 1996 [JP] Japan .................................. 8-320080

[51] Int. Cl.⁶ .................................................. H01H 47/02
[52] U.S. Cl. ......................... 361/159; 361/152; 361/191
[58] Field of Search ................................... 361/152, 154, 361/159, 160, 166–169.1, 191

[56] References Cited

U.S. PATENT DOCUMENTS

| | | | |
|---|---|---|---|
| 4,950,974 | 8/1990 | Pagano | 361/191 |
| 5,040,514 | 8/1991 | Kubach | 361/159 |
| 5,347,421 | 9/1994 | Alexanian | 361/154 |
| 5,552,954 | 9/1996 | Glehr | 361/191 |
| 5,793,127 | 8/1998 | Qualich | 361/152 |

FOREIGN PATENT DOCUMENTS 8-147053   6/1996   Japan .

*Primary Examiner*—Fritz Fleming
*Attorney, Agent, or Firm*—Pillsbury Madison & Sutro LLP

[57] ABSTRACT

A solenoid valve driving device includes a bypassing current path of which one end is connected to a point between a first switching device and a first solenoid valve and another end is connected to a point between a second switching device and a second solenoid valve, and an element disposed in the bypassing current path and having a characteristic that causes current to flow from the first switching device side to a second switching device side. By adopting the above described constitution, through current generated when the first switching device is switched from an OFF-state to an ON-state during duty control of the first switching device can be suppressed by the inductance of the second solenoid valve. In this way, one solenoid valve among a pair of the first and second solenoid valves, which is not operated, has a function of suppressing the through current.

11 Claims, 5 Drawing Sheets

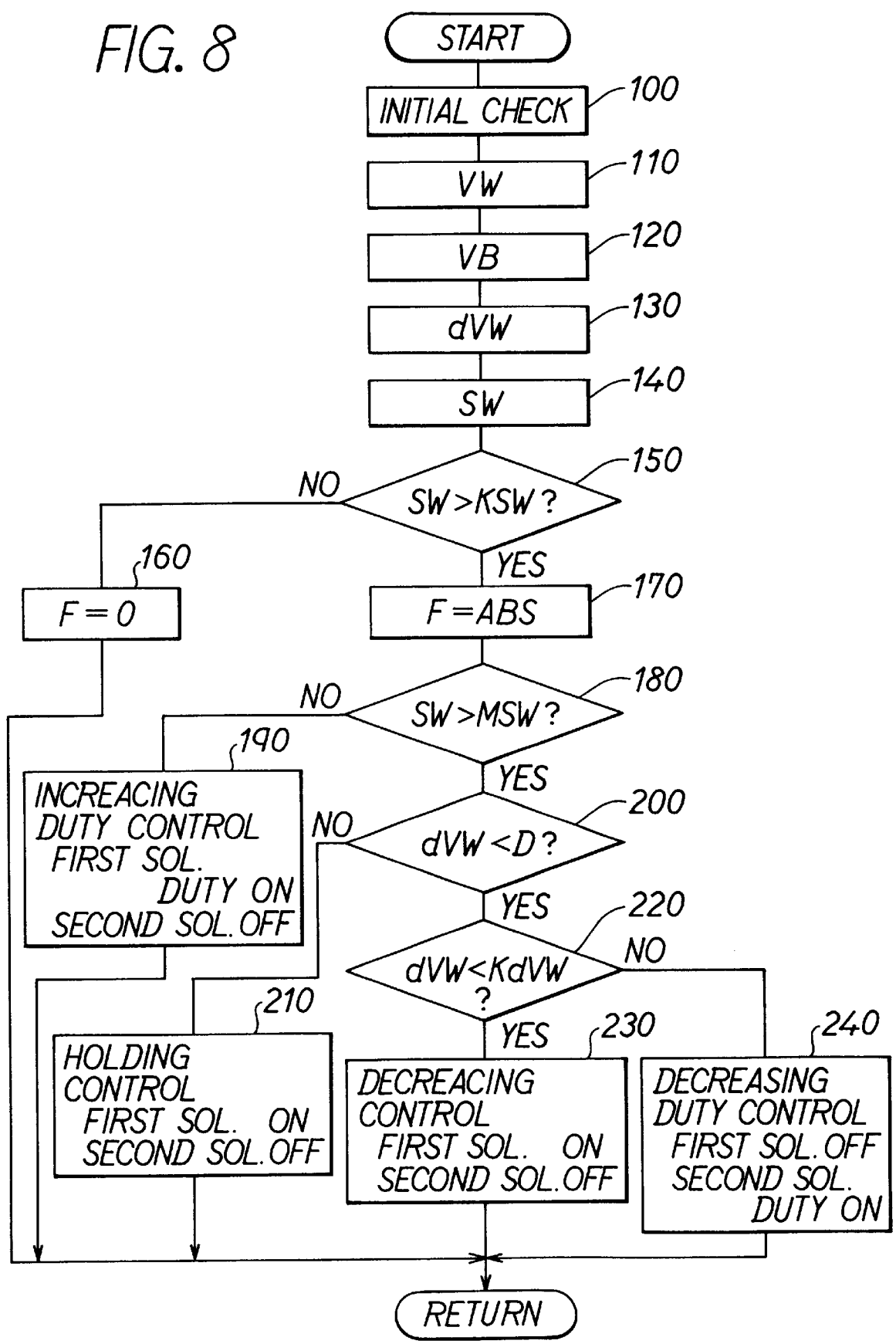

SOLENOID VALVE DRIVING DEVICE

CROSS REFERENCE TO RELATED APPLICATION

This application is related to prior Japanese Patent Applications No. H.8-320080 filed on Nov. 29, 1996 and No. H.9-304239 filed on Nov. 6, 1997, the contents of which are incorporated herein by reference.

BACKGROUND OF THE INVENTION

1. Field of the Invention:

The present invention relates to a solenoid valve driving device and, in particular, relates to a driving device for driving a plurality of solenoid valves which are parallel-supplied with electric power by an electric power supply source in common.

2. Related Art:

A solenoid coil of a solenoid valve which has been used for an anti-skid control device and has been operated under duty control (PWM control) has been driven by a driving circuit as shown in FIG. 9. In the driving device shown in FIG. 9, a first solenoid valve 3 is operated under duty control. In duty control, the mean current flowing through the first solenoid valve 3 is controlled by switching a first driving IC 4.

The driving circuit shown in FIG. 9 is provided with the first and the second driving ICs 4, 6 which receive and are driven by respective driving signals from a central processing unit (hereinafter referred to as "CPU 7"). The CPU 7 sends the electronic signals to the first and the second driving ICs 4, 6 via a buffer not shown or the like. When the driving ICs 4, 6 are turned on, a current from an electric power supply source 1 is supplied to the first solenoid valve 3 and the second solenoid valve 5 corresponding to the first driving IC 4 and the second driving IC 6, respectively. For example, when the first driving IC 4 is turned on, current flows from the electric power supply source 1 to the first solenoid valve 3 and the first driving IC 4 via a diode 2 and a choke coil 9. Immediately after the first driving IC 4 is turned off, the recirculation of the current occurs through the first solenoid valve 3 and a recirculation diode 8 which is connected in parallel to the first solenoid valve 3. A recirculation diode may be connected in parallel to the second solenoid valve 5, however, since it produces the same effect as the recirculation diode 8, the representation in the figure and the description thereof will be omitted. If the second solenoid valve 5 is not operated under duty control, the recirculation diode is not required for the second solenoid valve 5.

In this circuit structure, there is a problem that, when the first driving IC 4 is switched from an OFF-state (shut-down state) to an ON-state (conductive state) while the first solenoid valve 3 is operated under duty control, the recirculation diode 8 connected in parallel to the first solenoid valve 3 does not come to a state in which it prevents the current flowing in a reverse direction at the same time when the first driving IC 4 is turned on. That is, the recirculation diode 8 comes to a reverse direction current prevention state (a one-way current passing state) in which current is prevented from flowing from the electric power supply source 1 to the first driving IC 4 through the recirculation diode after an instantaneous delay time has passed since the first driving IC 4 is turned on. During this delay time, bypassing current flows from the electric power supply source 1 to the first driving IC 4 through the recirculation diode 8 (hereinafter referred to as "through current"). Since the change of the through current is very rapid, surge voltage is produced by the parasitic inductance of the wire in the circuit. As a result, a problem is produced such that the recirculation diode 8 and the first driving IC 4 are required to have a large margin on withstand voltage. In addition, the surge voltage and the surge current cause radio-noises.

Therefore, as shown in FIG. 9, a choke coil 9 has been provided in the upstream of the first solenoid valve 3 as a coil for preventing a rapid change of the through current. However, the choke coil provided in the circuit increases the number of parts and a production cost. In particular, if there are many solenoid valves driven by a solenoid valve driving device, for example, in the case of an anti-skid control device, many choke coils are required to prevent the surge voltage with the result that the production cost is further increased. If the choke coil 9 is not used, high-response recirculation diodes having a small delay in response need to be used, which also increases the production cost.

SUMMARY OF THE INVENTION

It is an object of the present invention to provide a solenoid valve driving device which can reduce its production cost by making use of one solenoid valve among a pair of solenoid valves as a choke coil in the conventional technique.

To achieve the above described object, a solenoid valve driving device according to the present invention is provided with a bypassing current path of which one end is connected to a point between a first switching device and a first solenoid valve and another end is connected to a point between a second switching device and a second solenoid valve, and an element disposed in the bypassing current path and having a characteristic that causes current to flow through the bypass current in a direction which does not substantially prevent the recirculation current of the first solenoid valve.

By adopting the above described constitution, the through current generated when the first switching device is switched from an OFF-state to an ON-state during duty control of the first switching device can be suppressed by the second solenoid valve. In this way, one solenoid valve among a pair of first and second solenoid valves, which is not operated, has a function of suppressing the through current. As a result, the number of parts in the solenoid driving device can be reduced. It is to be noted that a pair of first and second solenoid valves include a combination of at least one first solenoid valve which is operated under duty control and at least one second solenoid valve which is not supplied with a current while the first solenoid valve is operated under duty control.

When the bypassing current path is formed in an electronic control device, noises can be reduced.

When the present invention is applied to a brake system for an anti-skid control device or the like, the number of parts can be remarkably reduced because there are many sets of first and second solenoid valves used in the anti-skid control device. Further, the present invention is easily applied to the anti-skid control device, because current is not usually supplied to the second solenoid valve used as a pressure decreasing control valve when the first solenoid valve used as a pressure increasing control valve is operated under duty control in the anti-skid control device.

A diode may be used as the element disposed in the bypassing current path.

The solenoid valve driving circuit according to the present invention may be constituted as in the following. That is, the solenoid valve driving device comprises a control device for operating under duty control one of a first switching device and a second switching device and for shutting down the other switching device, a bypassing circuit path of which one end is connected to a point between the first switching device and the first solenoid valve and another end is connected to a point between the second switching device and the second solenoid valve, and a changing device for changing a direction of the current passing through the bypassing current path based on which of the first switching device and the second switching device is operated under duty control.

According to the above described constitution, the through current is suppressed by an opposing solenoid valve which is not operated under duty control. In addition, both of the first and second solenoid valves can be operated under duty control. That is, for example, when a diode is used as described above, only one solenoid valve can be operated under duty control. However, according to the above described constitution, both solenoid valves can be operated under duty control.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 8 is a flow chart showing an example of a control flow carried out in an anti-skid control device to which the present invention is applied.

PREFERRED EMBODIMENTS OF THE INVENTION

A solenoid valve driving device according to the present invention will be hereinafter described based on the accompanying drawings.

Figure 1:
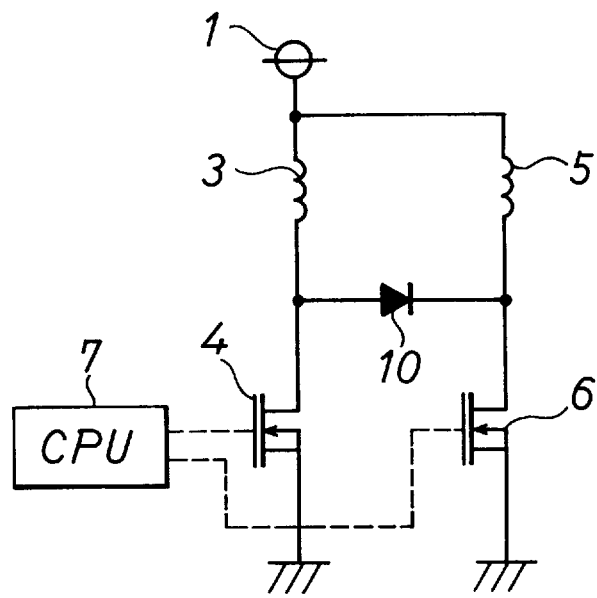
FIG. 1 is a circuit diagram showing the first embodiment of the present invention.

A first embodiment will be described with reference to FIG. 1. The parts having the same or corresponding functions as the parts described in FIG. 9 has will be designated by the same reference numerals and the description of those parts will be omitted. As shown in FIG. 1, the first embodiment has a feature such that a recirculation diode 10 is disposed in a path which connects the point between a first solenoid valve 3 and a first driving IC 4 with the point between a second solenoid valve 5 and a second driving IC 6. The recirculation diode 10 is connected such that it substantially allows current to pass only from the first solenoid valve 3 side to the second solenoid valve 5 side. A CPU 7 sends an electric signal to the first driving IC 4 and controls it so that the first solenoid valve 3 is operated under duty control. While the first driving IC 4 is operated under duty control, the second driving IC 6 is maintained in a shut-off state (an OFF-state).

The functions and advantages of the recirculation diode 10 connected in this way will be hereinafter described. While the first solenoid valve 3 is operated under duty control by the control of the first driving IC 4, the first solenoid valve 3 is supplied with current by an electric power supply source 1 when the first driving IC 4 is being turned on. Then, when the first driving IC 4 is switched from an ON-state to an OFF-state, a recirculation path is formed by the recirculation diode 10 and the first and second solenoid valves 3, 5 during the OFF state of the first driving IC 4 and recirculation current flows therethrough. Next, when the first driving IC 4 is switched from the OFF-state to the ON-state, since the recirculation diode 10 has a delay in response, the above-described through current flows from the electric power supply source 1 to the first driving IC 4 via the recirculation diode 10. However, since there is the second solenoid valve 5 disposed between the electric power supply source 1 and the recirculation diode 10, the through current is prevented from increasing by the inductance of the second solenoid valve 5. That is, since the recirculation diode 10 is disposed such that the second solenoid valve 5 which is one of a pair of first and second solenoid valves and is not operated under duty control has the function of a conventional choke coil, the conventional choke coil can be omitted.

Figure 9:
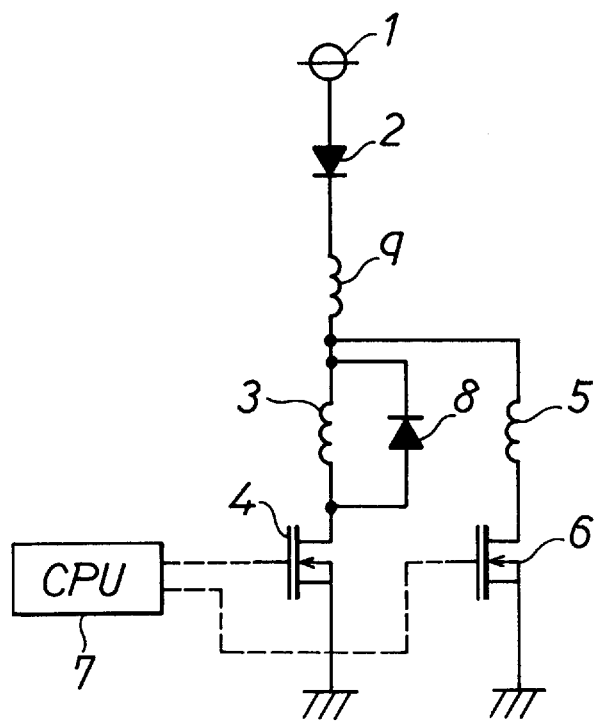
FIG. 9 is a circuit diagram showing a conventional technique.

Moreover, as compared with the conventional technique described with reference to FIG. 9, a diode 2 for restricting the direction of the current from the electric power supply source can be omitted in the present embodiment. That is, for example, when a well-known MOS-FET (Metal Oxide Semiconductor-Field Effect Transistor) is used as the first driving IC 4, the MOS-FET has a parasitic diode (a diode which allows current to flow only in one direction from the grounding side to the first solenoid valve 3 side and is connected in parallel with the first driving IC 4). Therefore, if the electric power source is reversely connected by a malfunction or by a misoperation in FIG. 9 (if the current flows as follows; the grounding side→the first driving IC 4→the first solenoid valve 3 and the recirculation diode 8→the choke coil 9), there is a possibility that excessively large current passes through the parasitic diode and the recirculation diode 8, whereby the first driving IC 4 and the recirculation diode 8 are broken by such an overcurrent. Furthermore, the resistance of the choke coil 9 in FIG. 9 is usually set much smaller than the resistance of the first solenoid valve 3 in order not to prevent the power supply from the electric power supply source 1. Therefore, the choke coil 9 will not sufficiently suppress the current from passing through the first driving IC 4 and the recirculation diode 8. Hence, an overcurrent passes through the parasitic diode and the recirculation diode 8. Accordingly, the diode 2 is disposed to prevent the overcurrent from passing through the first driving IC 4 and the recirculation diode 8. In the present embodiment, however, since the second solenoid valve 5 which is used instead of the choke coil 9 has the sufficient resistance corresponding to the solenoid valve 3, even if current passes from the parasitic diode to the recirculation diode 10, it is expected that the resistance of the second solenoid valve 5 fully suppresses the current. Therefore, the diode 2 shown in FIG. 9 can be omitted, which also produces an advantage that production costs are expected to be reduced.

Figure 2:
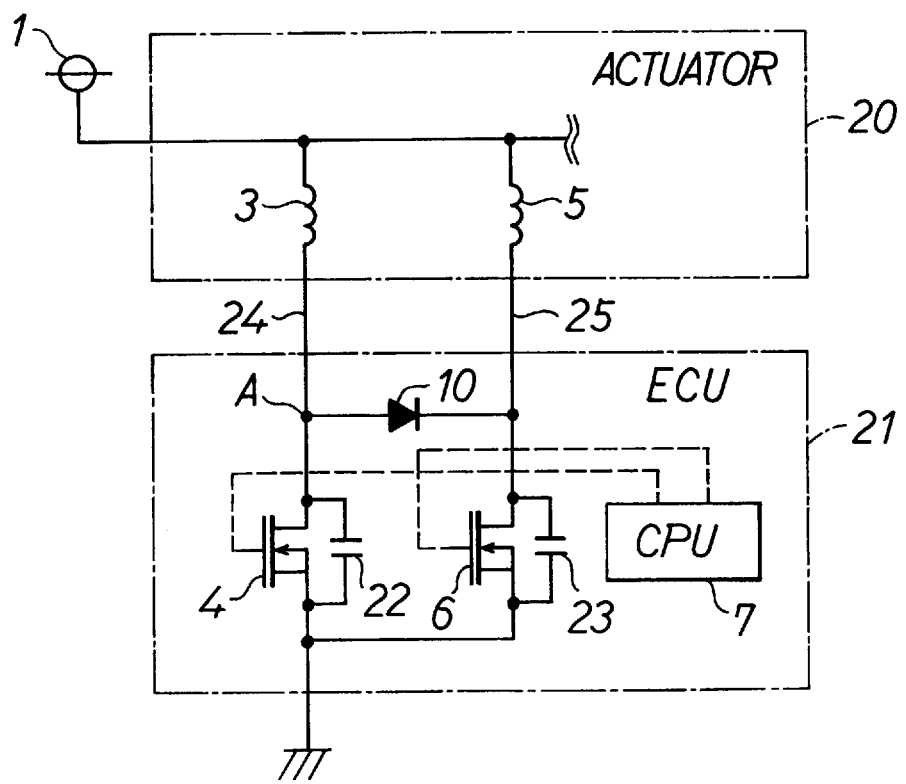
FIG. 2 is a circuit diagram showing the second embodiment of the present invention.

Next, the second embodiment will be described with reference to FIG. 2. The parts having the same functions and advantages as those of the above described embodiment has will be designated by the same reference numerals and the description of those parts will be omitted.

In the second embodiment, the first and the second solenoid valves 3, 5 are disposed in an actuator 20 and the CPU 7, the first and second driving ICs 4, 6 and the recirculation diode 10 are built in an electronic control unit 21 (hereinafter referred to as "ECU 21"). The actuator 20 is connected to the ECU 21 with wire harnesses 24, 25. Capacitors 22, 23 are connected in parallel with the first and the second driving ICs 4, 6, respectively. The capacitors 22, 23 are provided to prevent the first and the second driving ICs 4, 6 from being broken by static electricity applied to the ECU 21.

Figure 3:
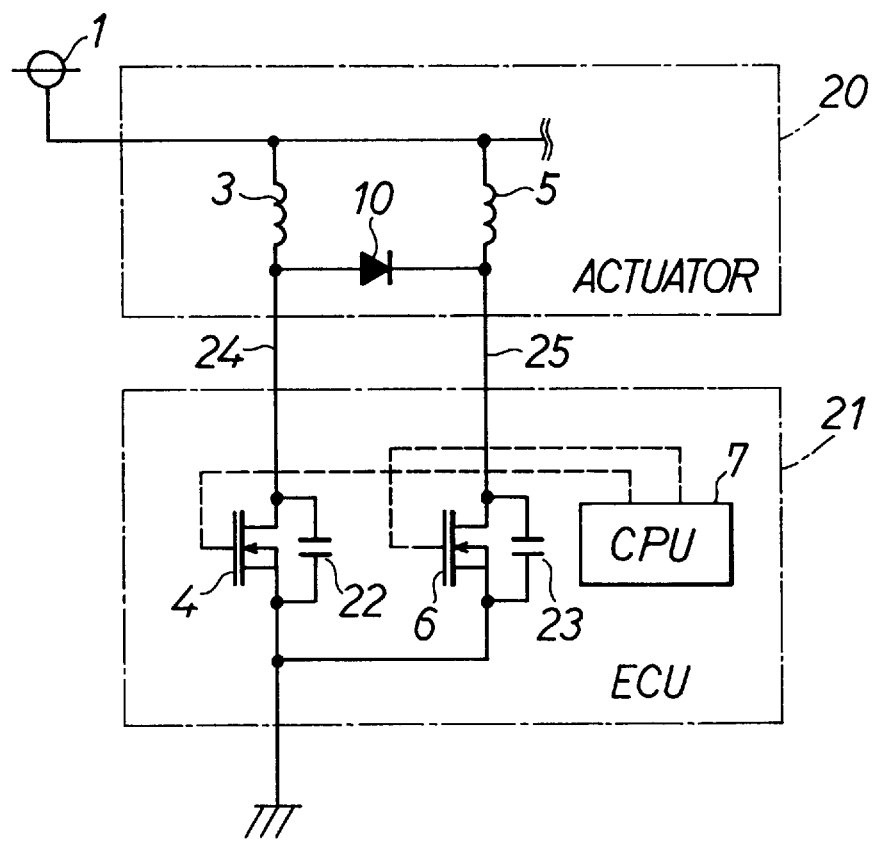
FIG. 3 is a circuit diagram showing the third embodiment of the present invention.

If the capacitors 22, 23 are disposed as shown in the present embodiment, the following advantages can be produced by forming the recirculation diode 10 in the ECU 21 in addition to the functions and advantages in the above-described first embodiment. That is, the noises caused by the inductance of the wire harnesses 24, 25 can be suppressed. When the first driving IC 4 is switched from the OFF-state to the ON-state, since the first driving IC 4 is grounded, the voltage at a point A lowers. As a result, current flows through the recirculation diode 10 in a reverse direction due to the electric charge accumulated in the capacitor 23, which is added to the through current described in the first embodiment, that is, the through current passing through the second solenoid valve 5 and the recirculation diode 10. Although the through current passing the second solenoid valve 5 is suppressed by the inductance of the second solenoid valve 5, there may be a case where the through current from the capacitor 23 is very large because it is not affected by the second solenoid valve 5. For example, as shown in FIG. 3, if the recirculation diode 10 is disposed in the actuator 20, the through current from the capacitor 23 passes through the wire harness 25, the recirculation diode 10, and the wire harness 24 and reaches the capacitor 22 connected across the first driving IC 4. When the through current passes through the wire harnesses 25, 24, it is predicted that the noises such as magnetic fields and the like are generated by the inductance of the wire harnesses 24, 25. However, as shown in the second embodiment, if the recirculation diode 10 is mounted in the ECU 21, it can prevent the noises such as magnetic field from being generated because the through current from the capacitor 23 does not pass through the wire harnesses 24, 25.

Even in the constitution shown in FIG. 3 as a third embodiment, i.e., in the case where the recirculation diode 10 is disposed in the actuator 20, the same functions and advantages as those in the first embodiment can be obtained.

Figure 4:
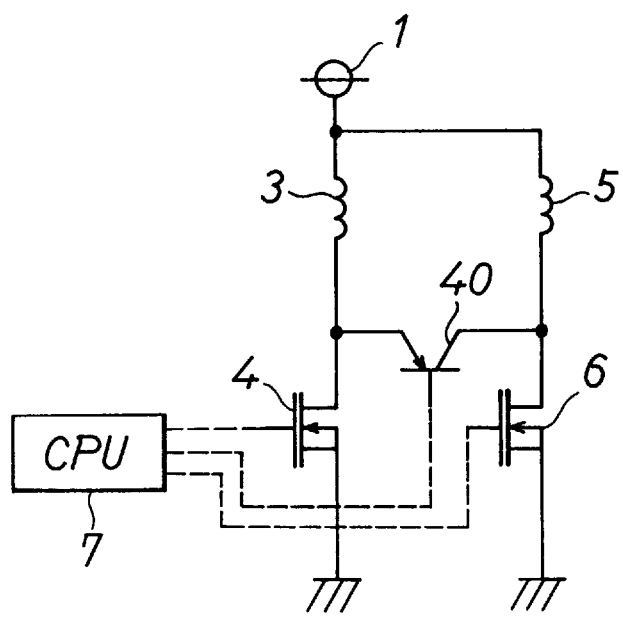
FIG. 4 is a circuit diagram showing the fourth embodiment of the present invention.

The present invention is not limited to the above described embodiments but it can be modified to various ways as shown below. For example, as shown in FIG. 4 as a fourth embodiment, instead of the recirculation diode 10 disposed in the above described embodiment, a recirculation transistor 40 may be used. In this case, the recirculation transistor 40 is switched by the CPU 7. That is, the recirculation transistor 40 is switched such that, when the first driving IC 4 is switched from the ON-state to the OFF-state, the current passes from the first solenoid valve 3 side to the second solenoid valve 5 side through the recirculation transistor 40.

Figure 5:
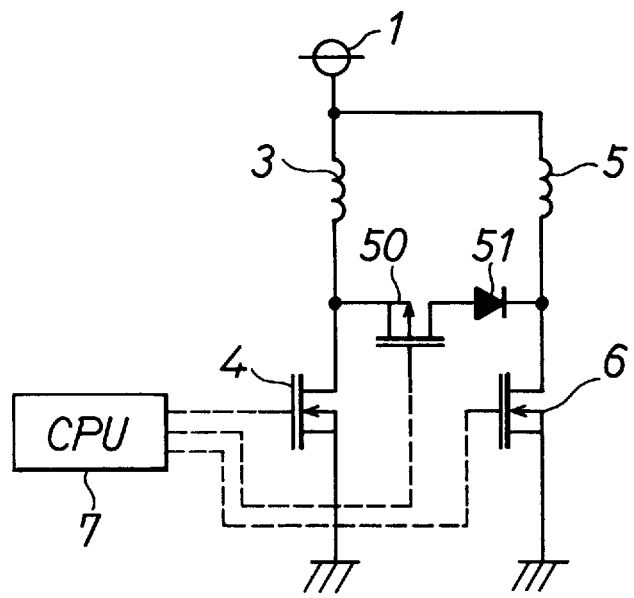
FIG. 5 is a circuit diagram showing the fifth embodiment of the present invention.

Moreover, as shown in FIG. 5, instead of the recirculation transistor 40, a MOS-FET 50 for recirculation use may be used. When the MOS-FET 50 is used, a diode 51 may be disposed because there may be the case where the MOS-FET has a parasitic diode not shown.

When the constitutions shown in FIG. 4, FIG. 5 are used, they can produce the better effects than the above described embodiments.

Furthermore, in FIG. 4, an another recirculation transistor may be additionally connected in parallel to the recirculation transistor 40 between a connecting point of the first solenoid valves 3 and the first driving IC 4 and a connecting point of the second solenoid valves 5 and the second driving IC 6 so that it allows current to pass in the direction opposite to the recirculation transistor 40. The CPU 7 controls the above-described recirculation transistor 40 so that the (recirculation) current passes through the recirculation transistor 40 when the first driving IC 4 is turned off while the first solenoid valve 3 is operated under duty control and the second solenoid valve 5 is not operated. On the contrary, the CPU 7 controls the recirculation transistor not shown so that the recirculation current passes through the recirculation transistor not shown when the second driving IC 6 is turned off while the second solenoid valve 5 is operated under duty control and the first solenoid valve 3 is not operated.

Figure 6:
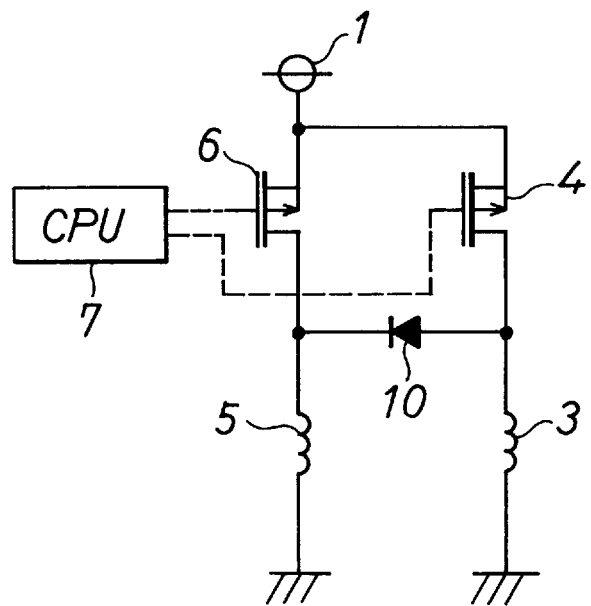
FIG. 6 is a circuit diagram showing the sixth embodiment of the present invention.

Although the above described embodiments are limited by conditions that the first solenoid valve 3 can be operated under duty control and that the second solenoid valve 5 can not be operated under duty control, if the another recirculation transistor is provided as described above, these solenoid valves are not subjected to the above described constraints of the operations thereof. It is to be noted that, as shown in FIG. 6, the order of electric connection between the electric power supply source 1 and a ground terminal may be as follows; the electric power supply source 1→the first and the second driving ICs 4, 6→the first and the second solenoid valves 3, 5→the ground terminal. Furthermore, the solenoid valve driving devices in the above described embodiments may be applied to an anti-skid control device or a traction control device of a brake system for a vehicle. That is, the above described first solenoid valve 3 is utilized as a pressure increasing control valve 50 and the second solenoid valve 5 may be utilized as a pressure decreasing control valve 51 in the brake system for a vehicle shown in FIG. 7. The pressure increasing control valve 50 is used as a valve for allowing or prohibiting the flow of brake fluid from a master cylinder 54 to a wheel cylinder 52 which produces wheel braking force. The pressure decreasing control valve 51 is used as a valve for controlling the flow of the brake fluid from the wheel cylinder 52 to a reservoir 55 when the pressure of the brake fluid applied to the wheel cylinder 52 is reduced. The pressure increasing control valve 50 is a normally-open valve whose valve body is in a communicating state when the power supply is shut off. The pressure decreasing control valve 51 is a normally-closed valve whose valve body is in a closed state when the power supply is shut off. In ordinary anti-skid control, the pressure decreasing control valve 51 is not operated under duty control. Only the pressure increasing control valve 51 is operated under duty control when the pressure of the wheel cylinder is gradually increased, that is, when a duty pressure increasing operation is carried out. The solenoid valve driving device described in the above described first embodiment or second embodiment can be easily applied to a brake system for performing anti-skid control like this. In addition, when the second driving IC 6 is turned on in a driving circuit using the recirculation diode 10, the current passes through not only the second solenoid valve 5 but also the first solenoid valve 3. However, when the pressure decreasing control valve 51 is turned on (in a communicating state) in the brake device shown in the figure, that is, when the pressure of the wheel cylinder 52 is reduced, the pressure increasing control valve 50 is also surely turned on (in a closed state). Therefore, even when a solenoid valve driving device provided with the recirculation diode 10 is applied to the brake system shown in FIG. 7, it is possible that the first solenoid valve 3 is used as the pressure increasing control valve and that the second solenoid valve 5 is used as the pressure decreasing control valve. Moreover, a solenoid valve driving device according to the present invention may be applied also to control the pressure increasing control valve 56 and the pressure decreasing control valve 57 for the wheel cylinder 53. By applying the present invention to the brake device for a vehicle having more than four wheels, the number of the choke coils necessitated in the conventional device which can be eliminated by the above-described embodiments increases in the entire brake system, resulting in realizing a great cost reduction.

Further, the solenoid valves 3, 5 of the solenoid valve driving device described in FIG. 4 or FIG. 5 may be applied to each valve in the brake system. In the constitution provided with the recirculation transistor 40 shown in FIG. 4 and the recirculation transistor not shown, both of the pressure increasing control valve 50 and the pressure decreasing control valve 51 can be operated under duty control.

Figure 7:
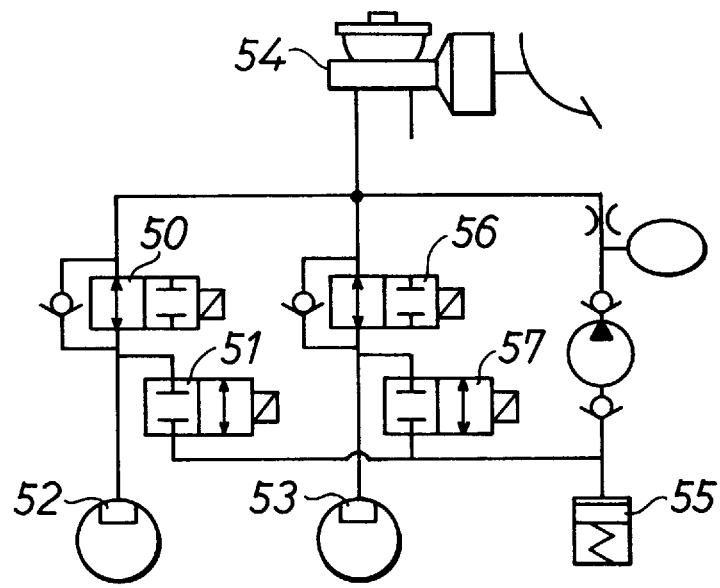
FIG. 7 is a view showing an example of a system to which a solenoid valve driving device according to the present invention is applied.

FIG. 8 is a flow chart showing an example of a control method for controlling the respective parts of the anti-skid control device shown in FIG. 7 (pressure increasing control valves 50, 56, pressure decreasing valves 51, 57 and a pump). The flow chart shown in FIG. 8 can be applied to the first embodiment, the second embodiment, and the like, if necessary.

A flow chart shown in FIG. 8 which is periodically carried out for each wheel will be described. In step 100, when the ignition switch of a vehicle is turned on, an initial check of each flag or the like is performed. In step 110, each wheel speed VW of a front-right wheel, a front-left wheel, a rear-right wheel and a rear-left wheel is calculated based on the output of wheel speed sensors not shown. In step 120, a vehicle body speed VB is calculated based on each wheel speed VW. In step 130, a wheel acceleration dVW of each wheel is calculated. In step 140, a slip ratio SW of each wheel is calculated.

In step 150, it is determined whether the slip ratio SW of a wheel which is an control object at present is larger than the first reference slip ratio KSW or not. If the negative determination is made, since it is determined that the wheel is not likely to be locked, the processing advances to step 160. In step 160, an ABS flag F is set at F=0, whereby a brake system is set in an ordinary braking state. If the affirmative determination is made in step 150, the processing advances to step 170. In step 170, the ABS flag F which shows that the brake system is under anti- skid control is set at F=ABS. Moreover, in step 170, electric power is supplied to a motor (not shown) for driving a pump at the same time.

In step 180, it is determined whether the slip ratio SW of the wheel which is a control object at present is larger than a second reference slip ratio MSW (SW>MSW) or not. When a negative determination is made, the processing advances to step 190. In step 190, pressure increasing duty control is performed to the wheel which is the control object.

For example, if a wheel provided with a wheel cylinder 52 is a wheel to be controlled, in pressure increasing duty control, a pulse-like current is provided to the pressure increasing control valve 50. At this time, the pressure decreasing control valve 51 is maintained in a closed valve position as in the case of the normal braking state. In many cases, step 190 is carried out in two or more control cycles later after the anti-skid control is started and decreasing control of the wheel cylinder pressure of a control object wheel is once performed.

If the affirmative determination is made in step 180, step 200 is performed. In step 200, it is determined whether the sign of the wheel acceleration dvw of the control object wheel is negative or not. That is, it is determined whether the wheel speed of the control object wheel is decelerating or accelerating. If the negative determination is made, step 210 is performed. In step 210, because it can be considered that the wheel speed tends to recover toward the vehicle body speed VB and that the wheel cylinder pressure has been suitably adjusted, pressure holding control is performed to hold the brake fluid pressure applied to the wheel cylinder of the control object wheel. For example, in this pressure holding control, current is continuously provided to the pressure increasing control valve 50 to set the valve position in a closed state and current is not provided to the pressure decreasing control valve 51 to set the valve position in a closed state.

If the determination is affirmative in step 200, step 220 is performed. It is determined in the step 220 whether the wheel acceleration dvw of the control object wheel is smaller than a reference wheel acceleration KdVW (KdVW<0) or not. If the determination is affirmative, step 230 is performed. In step 230, the wheel cylinder pressure of the control object wheel is continuously decreased. For example, current is continuously provided to both the pressure increasing control valve 50 and the pressure decreasing control valve 51 for a specified time, whereby the wheel cylinder pressure is rapidly decreased when it is estimated that the wheel speed is being decelerated by a large deceleration and the tendency for the wheel to be locked is strong. If the determination is negative in step 220, step 240 is performed. In step 240, a pressure decreasing duty control is performed for the wheel to be controlled. The pressure decreasing duty control is performed when the wheel cylinder pressure of the control object need not much rapidly be decreased. For example, in this pressure decreasing duty control, current is not provided to the pressure increasing control valve 50 and therefore its valve position is held in a communicating state, and the pressure decreasing control valve is operated under duty control, whereby the wheel cylinder pressure is decreased or increased in response to duty control of the pressure decreasing control valve. As a result, smooth decrease in the wheel cylinder pressure can be realized.

If control according to the flow chart shown in FIG. 8 is executed, in step 190, only the pressure increasing control valve among a pair of pressure increasing control valve and pressure decreasing control valve which are provided for one wheel cylinder is controlled under duty control. While the pressure increasing control valve is operated under duty control, the current is not provided to the pressure decreasing control valve. That is, the pressure decreasing control valve is maintained in an OFF-state. On the contrary, in a step 240, only the pressure decreasing control valve among the pair of the pressure increasing control valve and the pressure decreasing control valve is operated under duty control. While the pressure decreasing control valve is operated under duty control, the current is not provided to the pressure increasing control valve. That is, the pressure increasing control valve is in an OFF-state. Therefore, if, in the anti-skid control device in which control shown in FIG. 8 is performed, a recirculation transistor not shown is additionally provided in parallel to the recirculation transistor 40 between the connecting point of the first solenoid valves 3 and the first driving IC 4 and the connecting point of the first solenoid valve 5 and the second driving IC 6 in FIG. 4 such that it allows current to pass in the direction opposite to the recirculation transistor 40 and these recirculation transistors are turned on in response to duty control of each of the pressure increasing control valve and the pressure decreasing control valve, the above described functions and advantages can be obtained. Specifically, the recirculation transistor 40 is turned on in step 190 and the recirculation transistor connected in parallel to the recirculation transistor 40 is turned on step 240.

Moreover, if step 220 and step 240 are omitted in the flow chart shown in FIG. 8 and step 230 is performed when the determination in step 200 is affirmative, only the pressure increasing control valve among the pair of the pressure increasing control valve and the pressure decreasing control valve which are constituted for one wheel cylinder is operated under duty control in step 190. While the pressure increasing control valve is operated under duty control, the current is not provided to the pressure decreasing control valve. Therefore, the constitution of the first embodiment, the second embodiment or the like (constitutions shown in FIG. 1 to FIG. 6) in which the solenoid of the pressure decreasing control valve acts as a choke coil can be adopted for the control circuit of the brake system. Furthermore, even if the solenoid valve driving devices in the above described embodiments are applied to drive an air valve used in an air conditioner, it can obtain the same advantages as described above.

What is claimed is:

1. A solenoid valve driving device comprising:
   a first solenoid valve which is driven when receiving current supplied from an electric power supply source;
   a first switching device for passing and interrupting the current supplied to said first solenoid valve;
   a second solenoid valve which is supplied with current by said electric power supply source and is connected in parallel to said first solenoid valve;
   a second switching device for passing and interrupting the current supplied to said second solenoid valve;
   control means for operating under duty control said first switching device to supply ON-OFF current to said first solenoid valve and for maintaining said second switching device in a non-conductive state while said first switching device is operated under duty control; and
   an element disposed in a bypassing current path and having a characteristic that causes current to flow through the bypassing current path in a direction which does not substantially prevent recirculation current of said first solenoid valve generated when the current supplied to said first solenoid valve is interrupted by said first switching device, wherein one end of said bypassing current pass is connected to a point between said first switching device and said first solenoid valve and another end thereof is connected to a point between said second switching device and said second solenoid valve.

2. A solenoid valve driving device as claimed in claim 1, wherein
said first and second switching devices and said control means are incorporated in an electronic control device,
capacitors are connected in parallel to said first and second switching devices in said electronic control device, respectively, and
said bypassing current path is formed in said electronic control device.

3. A solenoid valve driving device as claimed in claim 1, wherein said first solenoid valve is used as a pressure increasing control valve which allows or interrupt the flow of brake fluid toward a wheel cylinder so as to ensure an optimal slip state of a wheel when a vehicle is braked and said second solenoid valve is used as a pressure decreasing control valve which allows or interrupt the flow of brake fluid from said the wheel cylinder so as to ensure said optimal slip state of said wheel when said vehicle is braked.

4. A solenoid valve driving device as claimed in claim 1, wherein said element disposed in said bypassing current path comprises a diode which substantially allows the current to flow only in a direction which does not prevent said recirculation current of said first solenoid valve.

5. A solenoid valve driving device as claimed in claim 1, wherein said element disposed in said bypassing current path comprises a diode which substantially allows the current to flow from a first solenoid valve side to a second solenoid valve side.

6. A solenoid valve driving device as claimed in claim 1, wherein, while said first switching device supplies said ON-OFF current to said first solenoid valve under duty control, said second switching device does not pass a current supplied to said second solenoid valve.

7. A solenoid valve driving device comprising:
   a first solenoid valve which is driven when receiving current supplied from an electric power supply source;
   a first switching device for passing and interrupting the current supplied to said first solenoid valve;
   a second solenoid valve which is supplied with current by said electric power supply source and is connected in parallel to said first solenoid valve;
   a second switching device for passing and interrupting the current supplied to said second solenoid valve;
   control means for operating under duty control said first switching device to supply ON-OFF current to said first solenoid valve and for maintaining said second switching device in a non-conductive state while said first switching device is operated under duty control; and
   an element disposed in a bypassing current path and having a characteristic that causes current to flow from a first switching device side to a second switching device side, wherein one end of said bypassing current path is connected to a point between said first switching device and said first solenoid valve and another end thereof is connected to a point between said second switching device and said second solenoid valve.

8. A solenoid valve driving device as claimed in claim 7, wherein
said first and second switching devices and said control means are incorporated in an electronic control device,
said bypassing current path is formed in said electronic control device,
said first solenoid valve and said second solenoid valve are electrically connected to said electric control device by a wire harness extending from said electronic control device and are disposed in an actuator which is provided separately from said electronic control device.

9. A solenoid valve driving device comprising:

a first solenoid valve which is driven when receiving current supplied from an electric power supply source;

a first switching device for passing and interrupting the current supplied to said first solenoid valve;

a second solenoid valve which is supplied with current by said electric power supply source and is connected in parallel to said first solenoid valve;

a second switching device for passing and interrupting the current supplied to said second solenoid valve;

control means for operating under duty control either one of said first switching device and said second switching device and for maintaining another one thereof in a non-conductive state; and a changing device for changing a direction of the current passing through a bypassing current path based on which of said first switching device and said second switching device is operated under duty control, wherein one end of said bypassing current path is connected to a point between said first switching device and said first solenoid valve and another end thereof is connected to a point between said second switching device and said second solenoid valve.

10. A solenoid valve driving device as claimed in claim 9, wherein, while said first switching device supplies said ON-OFF current to said first solenoid valve under duty control, said second switching device prohibits current from being supplied to said second solenoid valve, and while said second switching device supplies said ON-OFF current to said second solenoid valve under duty control, said first switching device prohibits current from being supplied to said first solenoid valve.

11. A solenoid valve driving device provided with an anti-skid control device for controlling brake fluid pressure applied to a wheel cylinder by opening or closing a hydraulic circuit connected thereto by a solenoid valve to adjust a slippage state of a wheel when a vehicle is braked, said solenoid valve driving device comprising:

a first solenoid valve which is driven when receiving current supplied from an electric power supply source so that said brake fluid pressure applied to said wheel cylinder is increased by allowing or prohibiting brake fluid to flow from a master cylinder to said wheel cylinder;

a first switching device for passing or interrupting the current supplied to said first solenoid valve;

a second solenoid valve which is supplied with current by said electric power supply source and is connected in parallel to said first solenoid valve, wherein said second solenoid valve decreases said brake fluid pressure applied to said wheel cylinder by allowing brake fluid to flow from said wheel cylinder to a reservoir which stores brake fluid discharged from said wheel cylinder when supplied with current;

a second switching device for passing or interrupting the current supplied to said second solenoid valve;

control means for operating under duty control said first switching device to supply ON-OFF current to said first solenoid valve and for maintaining said second switching device in a non-conductive state while said first switching device is operated under duty control; and an element disposed in a bypassing current path and having a characteristic that causes current to flow from a first switching device side to a second switching device side, wherein one end of said bypassing current path is connected to a point between said first switching device and said first solenoid valve and another end thereof is connected to a point between said second switching device and said second solenoid valve.

* * * * *